(12) United States Patent
Buttolo et al.

(10) Patent No.: US 12,534,019 B2
(45) Date of Patent: Jan. 27, 2026

(54) FORCE TOUCH AND HAPTICS BASED DIGITAL SHADE CONTROL

(71) Applicant: Ford Global Technologies, LLC, Dearborn, MI (US)

(72) Inventors: Pietro Buttolo, Dearborn Heights, MI (US); Neha Singhal, Northville, MI (US); Biaohe Guo, Northville, MI (US); Mark Larry, Macomb, MI (US); Kenneth Michael Mayer, Ypsilanti, MI (US)

( * ) Notice: Subject to any disclaimer, the term of this patent is extended or adjusted under 35 U.S.C. 154(b) by 629 days.

(21) Appl. No.: 18/149,023

(22) Filed: Dec. 30, 2022

(65) Prior Publication Data
US 2024/0217435 A1 Jul. 4, 2024

(51) Int. Cl.
| | |
|---|---|
| B60R 1/08 | (2006.01) |
| B60J 1/00 | (2006.01) |
| B60J 3/04 | (2006.01) |
| G02F 1/163 | (2006.01) |
| G06F 3/01 | (2006.01) |
| H03K 17/96 | (2006.01) |

(52) U.S. Cl.
CPC .............. B60R 1/088 (2013.01); B60J 1/00 (2013.01); B60J 3/04 (2013.01); G02F 1/163 (2013.01); G06F 3/016 (2013.01); H03K 17/962 (2013.01); *H03K 2217/96062* (2013.01)

(58) Field of Classification Search
None
See application file for complete search history.

(56) References Cited

U.S. PATENT DOCUMENTS

| | | |
|---|---|---|
| 9,776,478 B2 | 10/2017 | Dryselius et al. |
| 9,994,090 B2 | 6/2018 | Li |

FOREIGN PATENT DOCUMENTS

| | | |
|---|---|---|
| CN | 207257311 U | 4/2018 |
| CN | 111376684 A | 7/2020 |
| WO | 2021156143 A1 | 8/2021 |

OTHER PUBLICATIONS

Continental "Continental Enhances Intelligent Glass Control" (Jul. 2019).

*Primary Examiner* — Richard H Kim
(74) *Attorney, Agent, or Firm* — Frank Lollo; Eversheds Sutherland (US) LLP (57) ABSTRACT

Systems and methods for digital shading control in a vehicle. The digital shading control may be integrated into glass of a vehicle, pillars, and more. In at least one implementation, the digital shading control is integrated directly into glass of a vehicle and comprises a transparency-changing material interface layer disposed of over the glass, a capacitive touch interface layer disposed of over the transparency-changing material interface layer, a force touch interface layer disposed of over the capacitive touch interface layer, and a haptics interface layer disposed of over the force touch interface layer.

20 Claims, 8 Drawing Sheets

FIG. 1

Scenario 1: Adjust Shading For Entire Windshield/Window

Scenario 2: Zone-Based Shading

FIG. 2

Scenario 1: Multi-Zone Shading With Pre-Defined Zones

Select Pre-Defined Zone

Adjust Intensity Based On Force Touch

Scenario 2: Multi-Zone Shading With User-Customizable Zones

Select Area With Finger To Define Zone

Adjust Intensity Based On Force Touch

FORCE TOUCH AND HAPTICS BASED DIGITAL SHADE CONTROL

BACKGROUND

Privacy glass is used for many purposes in vehicles. Among those, is the use of privacy glass to provide shading for people inside the vehicle. However, a problem with the use of privacy glass in this context is that glass transparency is fixed when it is applied. Once privacy glass is applied, there is no way for people inside to change the transparency of glass. People may, at some times, desire a highly transparent window and, at other times, desire a highly opaque window.

While after-market solutions for transparency-changing windows exist, these have many shortcomings. Many after-market solutions are very bulky and require additional power sources. Although some original equipment manufacturers (OEMs) and suppliers have attempted to produce transparency-changing windows using transparency-changing materials, those solutions are solely based on integrating capacitive touch technology and/or adding additional control buttons. However, these solutions have shortcomings as well. Physical control buttons need to be integrated into the vehicle, and may make it more confusing for occupants.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for force touch and haptics based digital vehicular control of vehicle windshields, windows, and other glass. Individuals may interact with controls that are integrated directly into glass or other physical features of the vehicle, such as vehicle pillars. While various embodiments described in greater detail below will reference automotive shape design, it should be understood that such techniques may be applicable to other types of designs, including but not limited to airplane shape design, drone shape design, and other such industrial contexts.

Traditionally, digital shading controls have been used to provide for privacy. After-market solutions for transparency changing controls are typically very bulky and may require additional power sources. Furthermore, there are design challenges involved with regard to where and how interactive controls for such solutions should be installed in a vehicle.

In at least one embodiment of the present disclosure, a digital shade control system is integrated directly into glass of a vehicle, such as windshields, side windows and back windows based on their preference. Digital vehicle shade controls may be integrated directly into glass comprising four discrete layers: a haptics layer; a force-touch layer; a capacitive touch layer; and a transparency-changing material layer. Each of these layers may be a discrete layer of material that may be applied on glass such as a windshield of a vehicle and provide a desired level of transparency. For example, the glass may be fully transparent in a first mode of operation such that it provide the same or substantially similar properties as standalone glass, or may have a variable level of tinting or shading as specified by a user. In various embodiments, digital shading controls are directly applied to the glass such that a user may tap a control region of the glass to adjust the shading properties of the glass. For example, the transparency-level of the glass can be adjusted by tapping on a control region of the glass. The solution utilizes force touch technology and haptics technology for control and tactile feedback, according to various embodiments. Force touch technology and haptics technology can be integrated into glass and still keep the glass at a desired transparency. Vehicular windows, windshields, mirrors, etc., are integrated with shading technologies and touch capable according to various embodiments.

According to at least one aspect of the present disclosure, a digital shade control system integrates capacitive touch technology, surface haptics technology and force touch technology as layers of vehicular windshields/windows. Force touch technology may be used to control the intensity of glass shade based on how much force is applied on the surface.

According to at least one aspect of the present disclosure, a digital shade control system utilizes force touch technology to control the direction and area of glass shade based on how much force is applied on the surface. Shading regions may be pre-defined or arbitrarily defined by the user based on touch-based selections. Solution that creates the method of arbitrary shade area/intensity selection for users may use force touch technology plus capacitive touch technology or camera technologies.

According to at least one aspect of the present disclosure, a digital shade control system is integrated into a vehicle pillar. A control pillar can be used as a single area for shade control to control a windshield or window. For example, touching on any area or a specific area of the pillar can achieve pre-selection and pushing on the surface can change shade intensity. However, to achieve area control, a pillar can be divided into columns and rows, corresponding to areas in a windshield or vehicle window. By selecting one or more columns/rows, the system can control corresponding area(s) in a windshield or vehicle window.

Illustrative Embodiments

In at least one embodiment, multi-disciplinary systems and methods are devised for force touch and surface haptics based digital shade control in a vehicle.

In at least one embodiment, a vehicular digital shade control system is integrated directly into a glass panel, such as a windshield, side window, back window, side mirror, rearview mirror, etc. of a vehicle to allow users to adjust and control the transparency of such windows based on their preference. Force touch technology and surface haptics technology may be utilized in various implementations and may be integrated directly into glass to provide controls for adjusting the glass to a desired transparency. The solution utilizes force touch technology and haptics technology for control and tactile feedback, according to various embodiments. Force touch technology and haptics technology can be integrated into glass and still keep the glass at a desired transparency. Vehicular windows, windshields, mirrors, etc., are integrated with shading technologies and touch capable according to various embodiments.

A transparency-changing layer or interface may refer to various technologies known to one of skill in these art. Examples of such technologies include Polymer-dispersed Liquid Crystal (PDLC), Suspended Particle Devices (SPD), Electro-chromic (EC), Liquid Crystal (LC) plus dye and Electro-phoretic (EP), and more. These materials can be optically bonded to glass and can be electrically controlled to change opaqueness/transparency. A transparency-changing material interface may be applied as a layer on top of a transparent or semi-transparent surface such as a windshield, window, mirror, etc. of a vehicle.

A suitable force touch interface may be based on transparent materials that can be integrated with glass. A non-limiting, illustrative example of a force touch technology is transparent piezo films that can be used to sense forces applied on surfaces. The transparent piezo films can be laminated onto glass surfaces using optical bonding technology. Another technology is integrating a type of force sensitive material with capacitive touch sensors.

A surface haptics interface may be used to generate surface haptics and integrated with glass. One technology is based on electrostatic fields to generate surface haptics. The technology involves an additional ITO (indium tin oxide) layer to be laminated on top of a glass surface to generate surface haptics when a finger is moving on the surface. This technology does not necessarily support taps and clicks on a surface but instead, a user moves his/her fingers to get haptic feedback, for example, in a sliding motion. Another technology is based on ultrasonic fields. The technology needs very thin and small ultrasonic actuators to be attached to the back of glass to generate surface haptics. Various types of ultrasonic field technologies support taps and clicks.

A capacitive touch interface may be integrated with glass. In various embodiments, the capacitive touch interface is operable for users to select shading areas. Capacitive touch technology is based on capacitive coupling and can be used to detect and measure anything that is conductive or has a dielectric different from air. Many types of sensors use capacitive sensing, including sensors to detect and measure proximity, pressure, position and displacement, force, humidity, fluid level, and acceleration.

Figure 1:
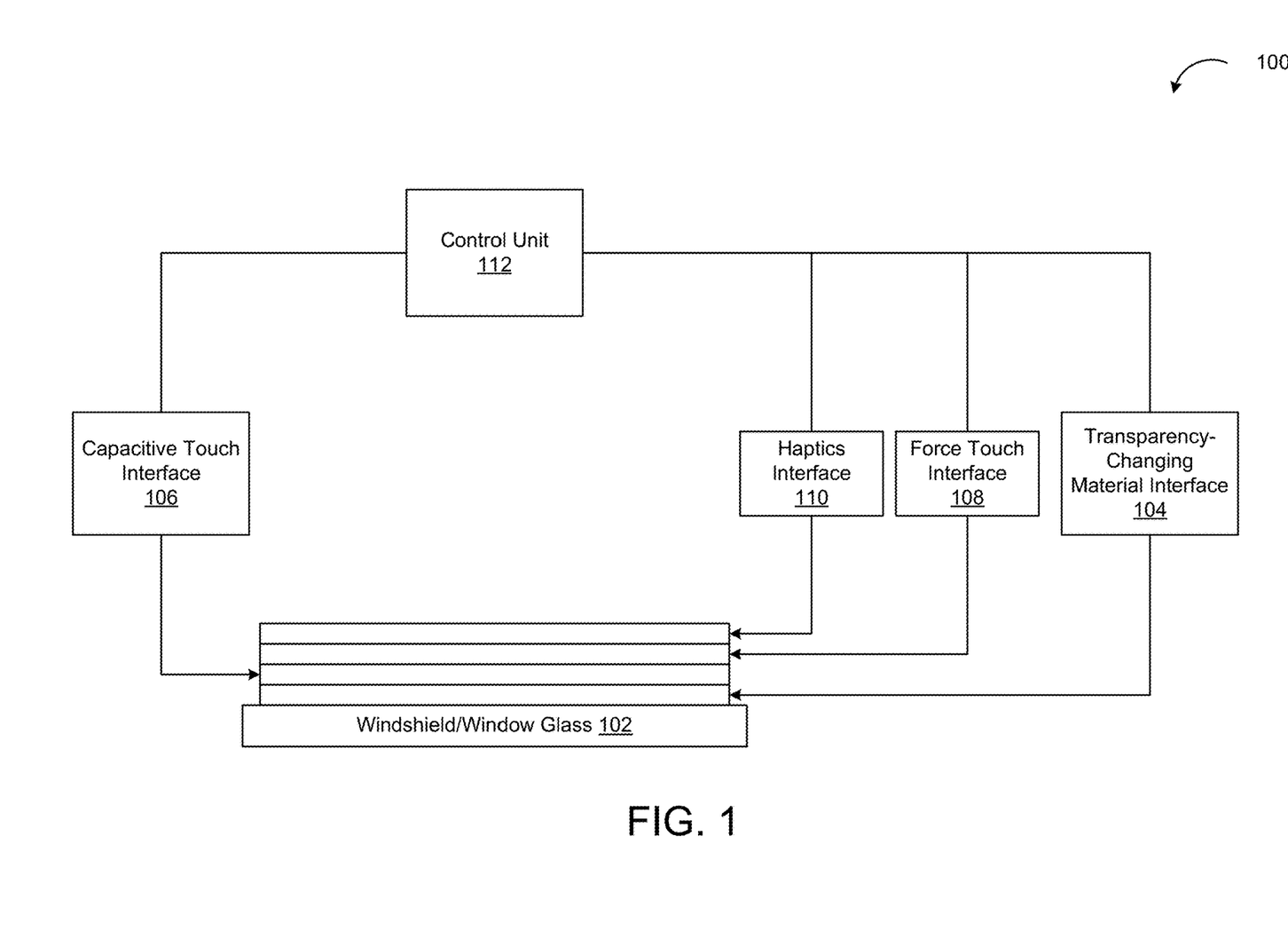
FIG. 1 depicts a diagram of an electrical architecture/interface for windshield/window implementation, according to at least one embodiment of the present disclosure.

FIG. 1 depicts a diagram 100 of an electrical architecture/interface for windshield/window implementation, according to at least one embodiment of the present disclosure.

In various embodiments, digital shading control technology is integrated in vehicle glass 102, such as on a windshield, side window, back window, side mirror, rearview mirror, etc. The shading controls can be applied to both interior and exterior sides of vehicle windshields, side windows etc. as long as regulations allow. In terms of autonomous vehicles, all windshields/windows could be designed to allow shade change when regulations allow. A description below is provided for a windshield or window glass as an illustrative, non-limiting example and the techniques described herein may be applied to other types of vehicle glass.

As depicted in FIG. 1, vehicle glass is integrated with a plurality of layers, comprising: a transparency-changing material interface 104; a capacitive touch interface 106; a force touch interface 108; and a haptics interface 110. A control unit 112 may refer to electrical circuitry that comprises executable instructions for receiving and processing user inputs. While the specific ordering of layers illustrated in FIG. 1 depicts the transparency-changing material interface 104 disposed of over the capacitive touch interface 106, the capacitive touch interface 106 disposed of over the force touch interface 108, and the force touch interface 108 disposed of over the haptics interface 110, this is merely one arrangement of the layers and other orders of these interface layers is also contemplated within the scope of this disclosure.

Transparency-changing interface 104 refers to technologies include Polymer-dispersed Liquid Crystal (PDLC), Suspended Particle Devices (SPD), Electro-chromic (EC), Liquid Crystal (LC) plus dye and Electro-phoretic (EP), etc. whose optical and opacity properties may be dynamically adjusted. Transparency-changing interface 104 may be implemented as a thin film that is applied on top of traditional vehicle glass. These materials can be optically bonded to glass and can be electrically controlled to change opaqueness/transparency. Light transmission properties of the transparency-changing interface may be dynamically controlled in response to an applied voltage. When a voltage is applied, the amount of light transmission may be applied. In various embodiments, the transparency-changing interface 104 does not require a constant electrical current—that is, once the change has been effected, no electricity is needed for maintaining the particular shade which has been reached. A transparency-changing material interface may be applied as a layer on top of a transparent or semi-transparent surface such as a windshield, window, mirror, etc. of a vehicle.

A capacitive touch interface 106 may be integrated with glass as depicted in FIG. 1. In various embodiments, the capacitive touch interface 106 is operable for users to select shading areas. Capacitive touch technology is based on capacitive coupling and can be used to detect and measure anything that is conductive or has a dielectric different from air. Many types of sensors use capacitive sensing, including sensors to detect and measure proximity, pressure, position and displacement, force, humidity, fluid level, and acceleration.

A suitable force touch interface 108 may be based on transparent materials that can be integrated with glass. A non-limiting, illustrative example of a force touch technology is transparent piezo films that can be used to sense forces applied on surfaces. The transparent piezo films can be laminated onto glass surfaces using optical bonding technology. Another technology is integrating a type of force sensitive material with capacitive touch sensors.

A surface haptics interface 110 may be used to generate surface haptics and integrated with glass. One technology is based on electrostatic fields to generate surface haptics. The technology involves an additional ITO (indium tin oxide) layer to be laminated on top of a glass surface to generate surface haptics when a finger is moving on the surface. This technology does not necessarily support taps and clicks on a surface but instead, a user moves his/her fingers to get haptic feedback, for example, in a sliding motion. Another technology is based on ultrasonic fields. The technology needs very thin and small ultrasonic actuators to be attached to the back of glass to generate surface haptics. Various types of ultrasonic field technologies support taps and clicks.

Control unit 112 may be implemented as electronic circuitry that is operable to detect and process control commands from a user. Force touch technology may provide signals that are used to determine a shading intensity. Haptics technology may be used to provide tactile feedback to the user. Capacitive touch technology may be used to trace finger movements.

Figure 2:
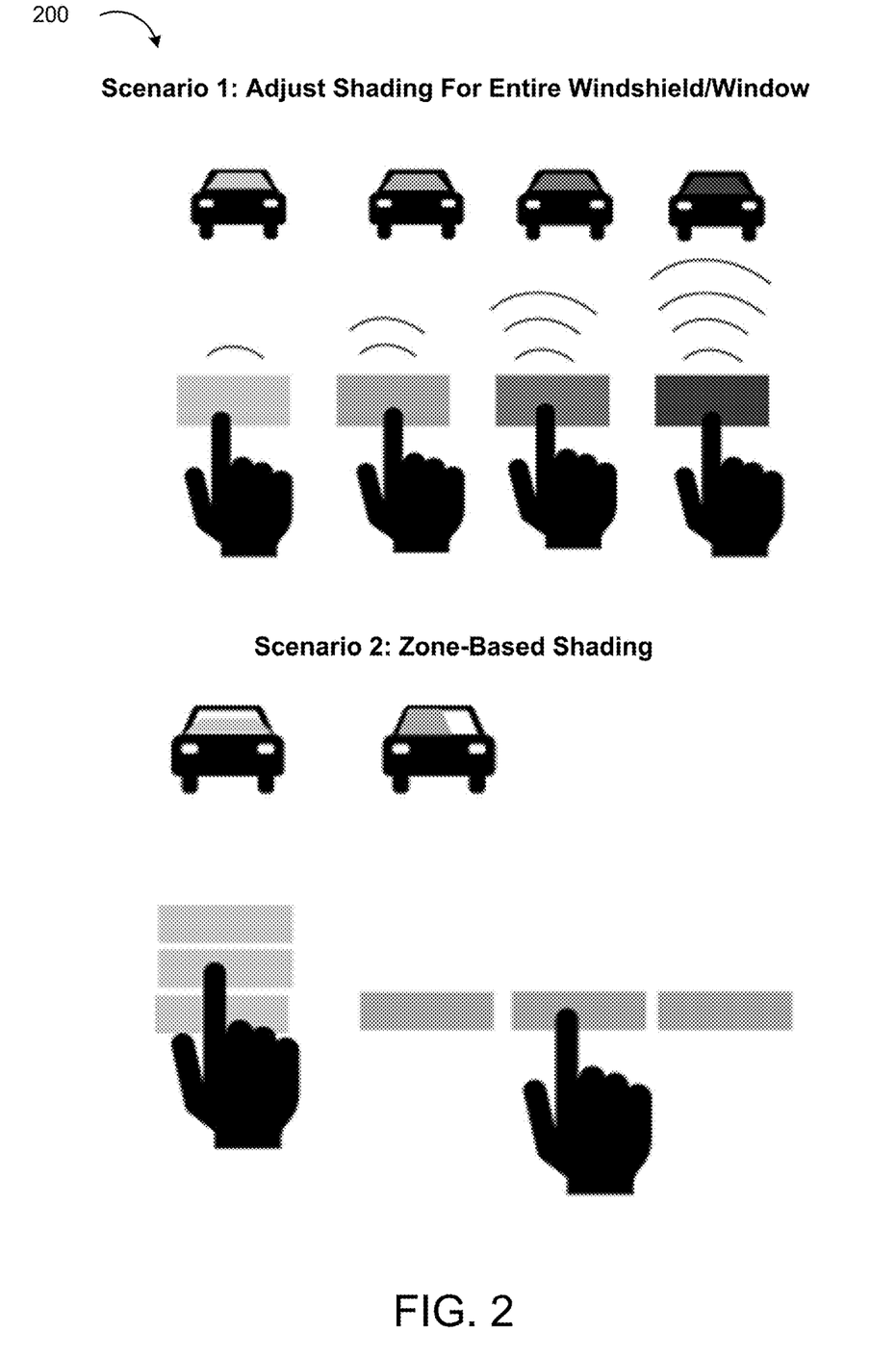
FIG. 2 depicts a diagram in which shading controls may be implemented, according to at least one embodiment of the present disclosure.

FIG. 2 depicts a diagram 200 in which shading controls may be implemented, according to at least one embodiment of the present disclosure.

In the upper portion of FIG. 2, users may interact with a control region integrated into glass. The control region may be situated in a location that is easy for the user reach, for example, while operating the vehicle. In various embodiments, a system (e.g., control unit) detects the force level applied on the glass surface using a force touch interface and, responsive to the amount of force applied, increases or decreasing shade of the whole area gradually to a desired level as the applied force goes up. For example, the longer the user holds and touches the control region, the darker the shading. In various embodiments, the touch action can be designed to be push-and-hold or finger sliding on the surface. FIG. 2 below shows an illustrative example of this scenario in which a user can tap and apply greater or lesser amounts of pressure to adjust the shading as desired. In various embodiments, surface haptics provides the user with tactile feedback indicating that the user's touch gesture has been detected and is being used to adjust the shading. In some embodiments, a user must first tap-and-hold the control region for a predetermined period before shading adjustment is initiated. This may be utilized so that shading adjustment is not performed when an individual inadvertently touches the control region. Haptics feedback may be used to signal when the user first touches the control region and then a second feedback signal may be provided when the shading adjustment is initiated.

The bottom portion of FIG. 2 depicts zone-based shading. In various embodiments, a control region of the glass includes different sub regions that correspond to different zones of the vehicle. For example, tapping different areas of the control region may apply shading to different zones of the glass. For example, in a windshield, a driver sub region and passenger sub region may exist to allow for passenger and driver shading preferences to both be honored. When a control unit detects the force level applied on the glass surface and increases the shading area (either in the horizontal direction or in the vertical direction) to a desired area (partial shade or full shade) as the applied force goes up. Also, after the shading area is fixed, the user can touch again to increase the shading intensity. Similarly, the touch action can be designed to be push-and-hold or finger sliding on the surface. In this scenario, the whole glass area is divided into several zones. For example, horizontal and/or vertical zones may be defined. FIG. 2 depicts an embodiment in which shading can be applied to pre-defined zones and/or user-customizable zones, for example, as discussed in connection with FIG. 3.

Shading controls as depicted in FIG. 2 can be implemented in the same piece of glass if desired. For example, controls for upper and lower portions of glass (e.g., as depicted in the upper portion of FIG. 2) can be designed to use one finger while controls for left and right portions of glass (e.g., as depicted in the lower portion of FIG. 2) can be designed to use two fingers. In various embodiments, double taps on the glass surface can remove or reset the shading control.

Figure 3:
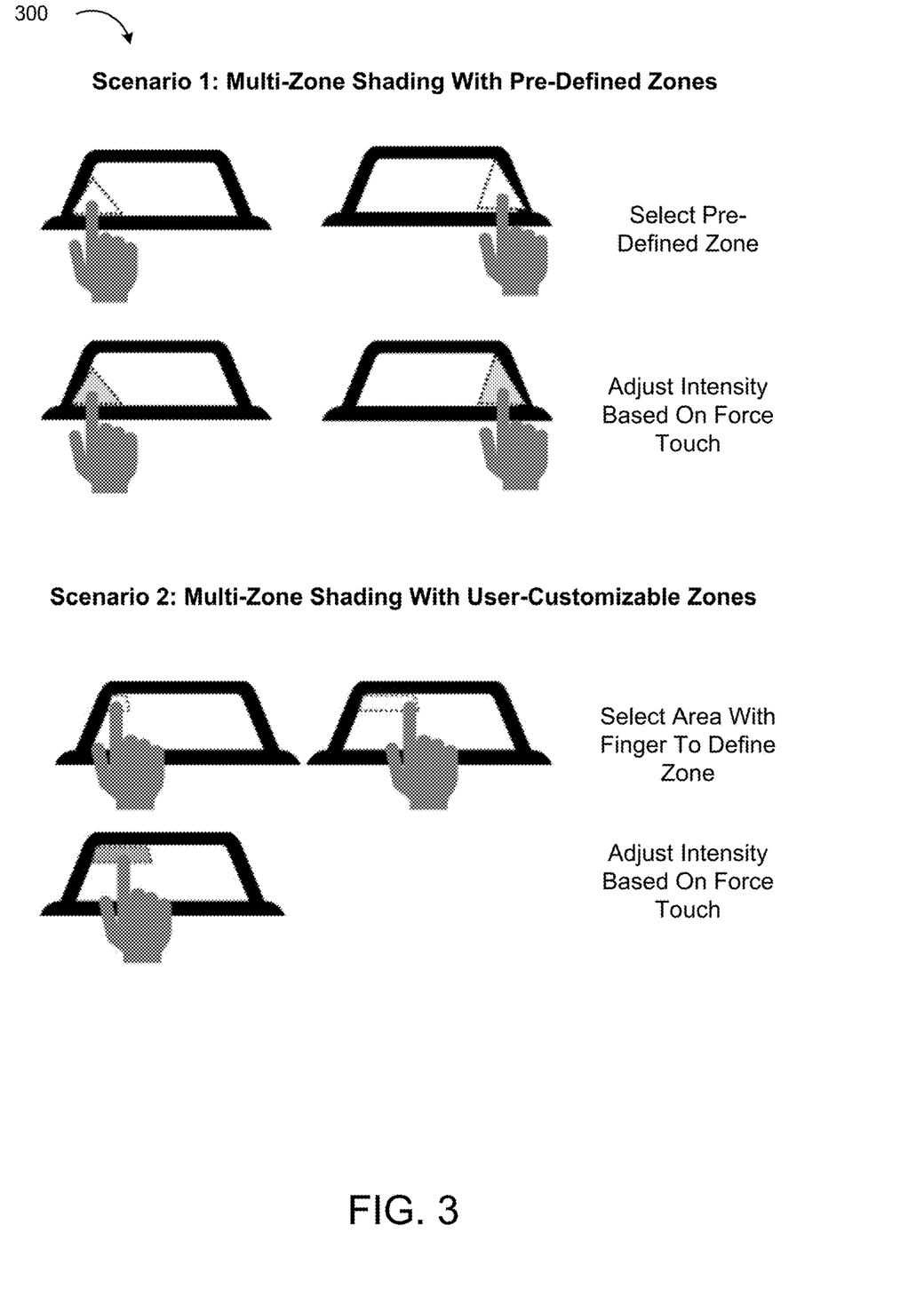
FIG. 3 depicts a diagram of multi-zone shading techniques, according to at least one embodiment of the present disclosure.

FIG. 3 depicts a diagram 300 of multi-zone shading techniques, according to at least one embodiment of the present disclosure.

In multi-zone applications, users can select desired areas firstly by touching/moving on the surface and then increase the shading intensity by applying forces. Multiple areas can be selected, and different level of shading intensities can be applied in different areas. Selected areas can be regular shapes (e.g., triangle, rectangle, etc.) if zones are designed into these shapes.

For example, the upper portion of FIG. 3 depicts multi-zone shading with pre-defined zones. Vehicle glass such as a windshield may be segmented into a plurality of non-overlapping zones. The zones may be pre-defined. A zone may be first selected by tapping, and then the shading intensity may be configured by subsequently adjusting the amount of force applied in a second tap.

The lower portion of FIG. 3 depicts multi-zone shading with user-customizable zones or regions. Vehicle glass such as a windshield may be segmented in response to a user selection. A user may tap and drag his or her finger across a portion of glass to identify a region to for shading control. The shape of the identified region may be a square, triangle, trapezoid, or any other suitable shape. Once a region has been selected, then the shading intensity for the user-selected region may be configured by subsequently adjusting the amount of force applied in a tap.

Figure 4:
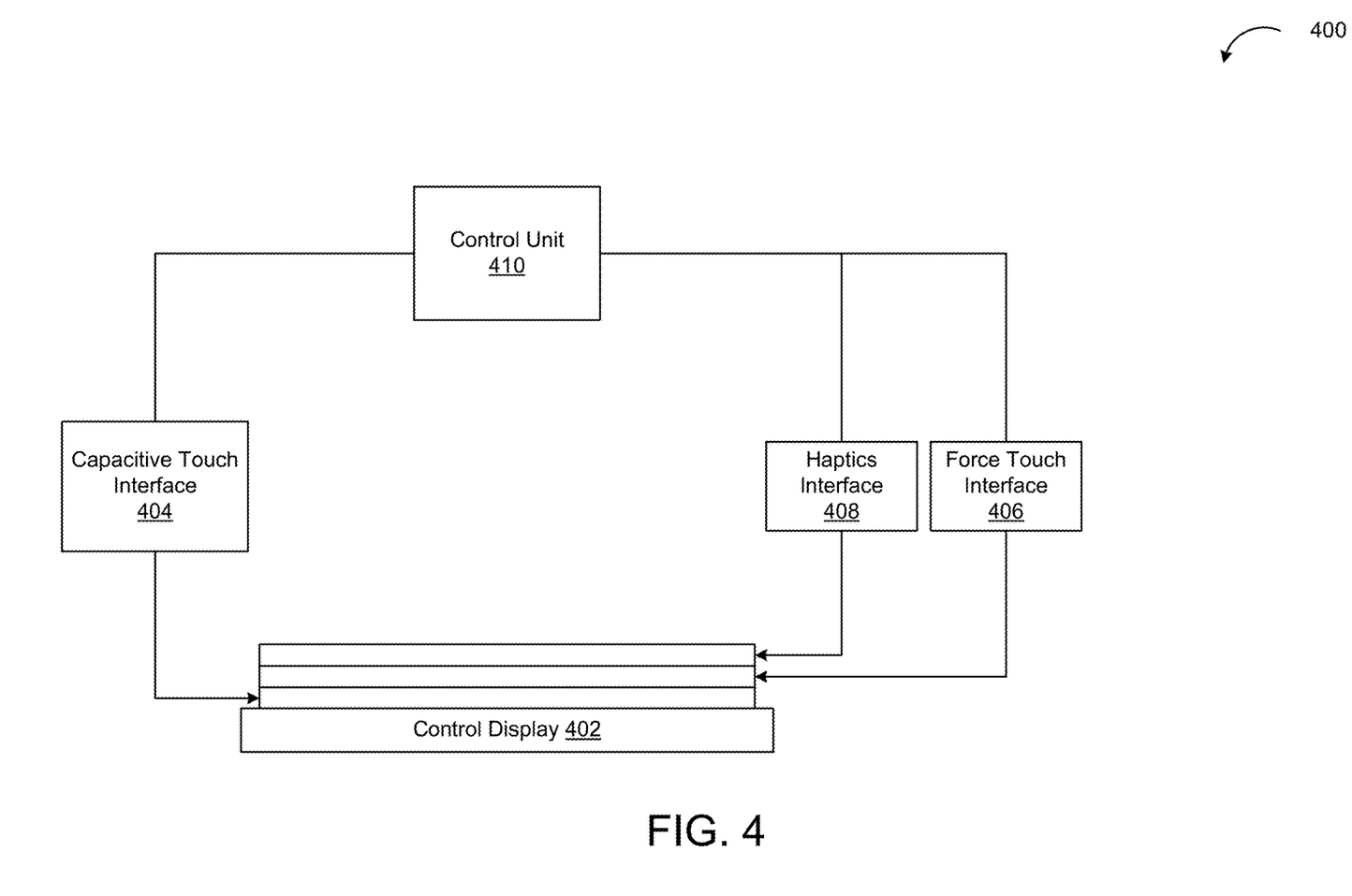
FIG. 4 depicts a diagram of an electrical architecture/interface for control display implementation, according to at least one embodiment of the present disclosure.

FIG. 4 depicts a diagram 400 of an electrical architecture/interface for control display implementation, according to at least one embodiment of the present disclosure.

In various embodiments, digital shading control technology is integrated in a control display 402 of a vehicle, such as an infotainment system, center stack display, or other in-vehicle displays.

As depicted in FIG. 4, control display 402 is integrated with a plurality of layers, comprising: a capacitive touch interface 404; a force touch interface 406; and a haptics interface 408. A control unit 410 may refer to electrical circuitry that comprises executable instructions for receiving and processing user inputs.

In at least one embodiment, control display 402 is integrated with a capacitive touch interface 404, a force touch interface, 406, and a haptics interface 408. Since the control display does not have to be transparent, both surface haptics technology and the traditional vibration haptics technology can be used. However, the haptics technology is optional since there could be no haptic feedback for users. The haptic feedback is independent and does not affect other technologies and features. It will be determined by vehicle designs to include it or not. Similarly, both the traditional force touch technology and transparent force touch technologies can be used in this implementation since the control display does not have to be transparent.

Various digital shading control techniques can be achieved in this implementation. Users only need to touch the control display 402 to control glass shade. For example, the windshield and side windows can be selected and displayed in the center stack displays for the driver to change shade.

A capacitive touch interface 404 may be integrated with control display 402 as depicted in FIG. 4. In various embodiments, the capacitive touch interface 404 is operable for users to select shading areas. Capacitive touch technology is based on capacitive coupling and can be used to detect and measure anything that is conductive or has a dielectric different from air. Many types of sensors use capacitive sensing, including sensors to detect and measure proximity, pressure, position and displacement, force, humidity, fluid level, and acceleration.

A suitable force touch interface 406 may be based on transparent materials that can be integrated with glass. A non-limiting, illustrative example of a force touch technology is transparent piezo films that can be used to sense forces applied on surfaces. The transparent piezo films can be laminated onto glass surfaces using optical bonding technology. Another technology is integrating a type of force sensitive material with capacitive touch sensors.

A haptics interface 408 may be used to generate surface haptics and integrated with glass. Both surface haptics technology and traditional vibration haptics technology can be used. One technology is based on electrostatic fields to generate surface haptics. The technology involves an additional ITO (indium tin oxide) layer to be laminated on top of a glass surface to generate surface haptics when a finger is moving on the surface. Another technology is based on ultrasonic fields. The technology needs very thin and small ultrasonic actuators to be attached to the back of glass to generate surface haptics. Various types of ultrasonic field technologies support taps and clicks.

Control unit 410 may be implemented as electronic circuitry that is operable to detect and process control commands from a user. Force touch technology may provide signals that are used to determine a shading intensity. Haptics technology may be used to provide tactile feedback to the user. Capacitive touch technology may be used to trace finger movements. Control unit 410 may be connected to one or more vehicle glasses, such as windshields and side windows with transparency-changing material interfaces that can be controlled by the control unit 410.

Figure 5:
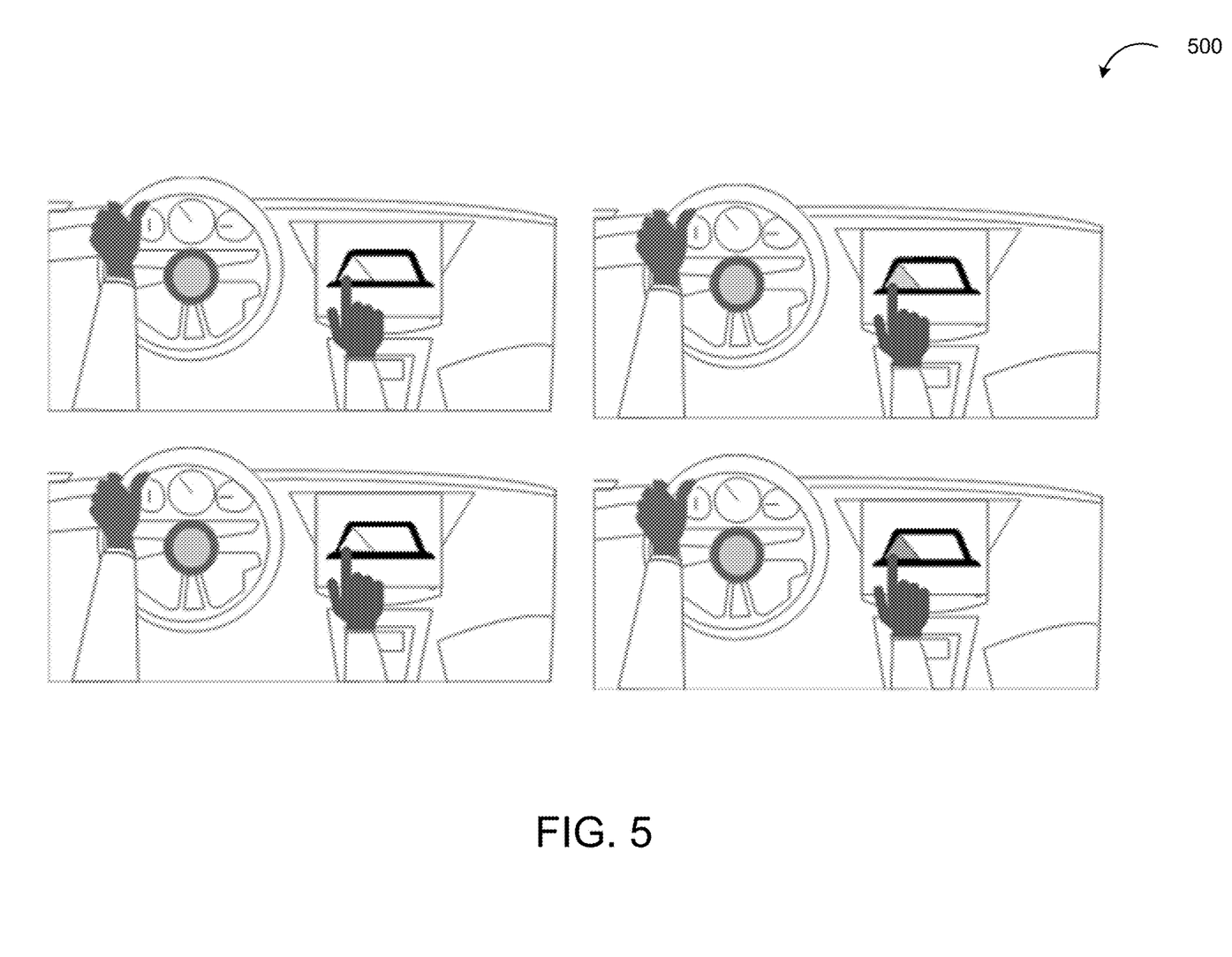
FIG. 5 depicts a diagram of an in-vehicle display implementation, according to at least one embodiment of the present disclosure.

FIG. 5 depicts a diagram 500 of an in-vehicle display implementation, according to at least one embodiment of the present disclosure. In various embodiments, a center stack display acts as a control unit for digital shading controls. This implementation integrate force touch, haptics, and/or capacitive touch interface technologies in a relatively small area. However, users who do not have access to the control display may not be able to use this function. There could be multiple control displays in a vehicle for users to control multiple vehicle windows (e.g., in a ride sharing vehicle).

Figure 6:
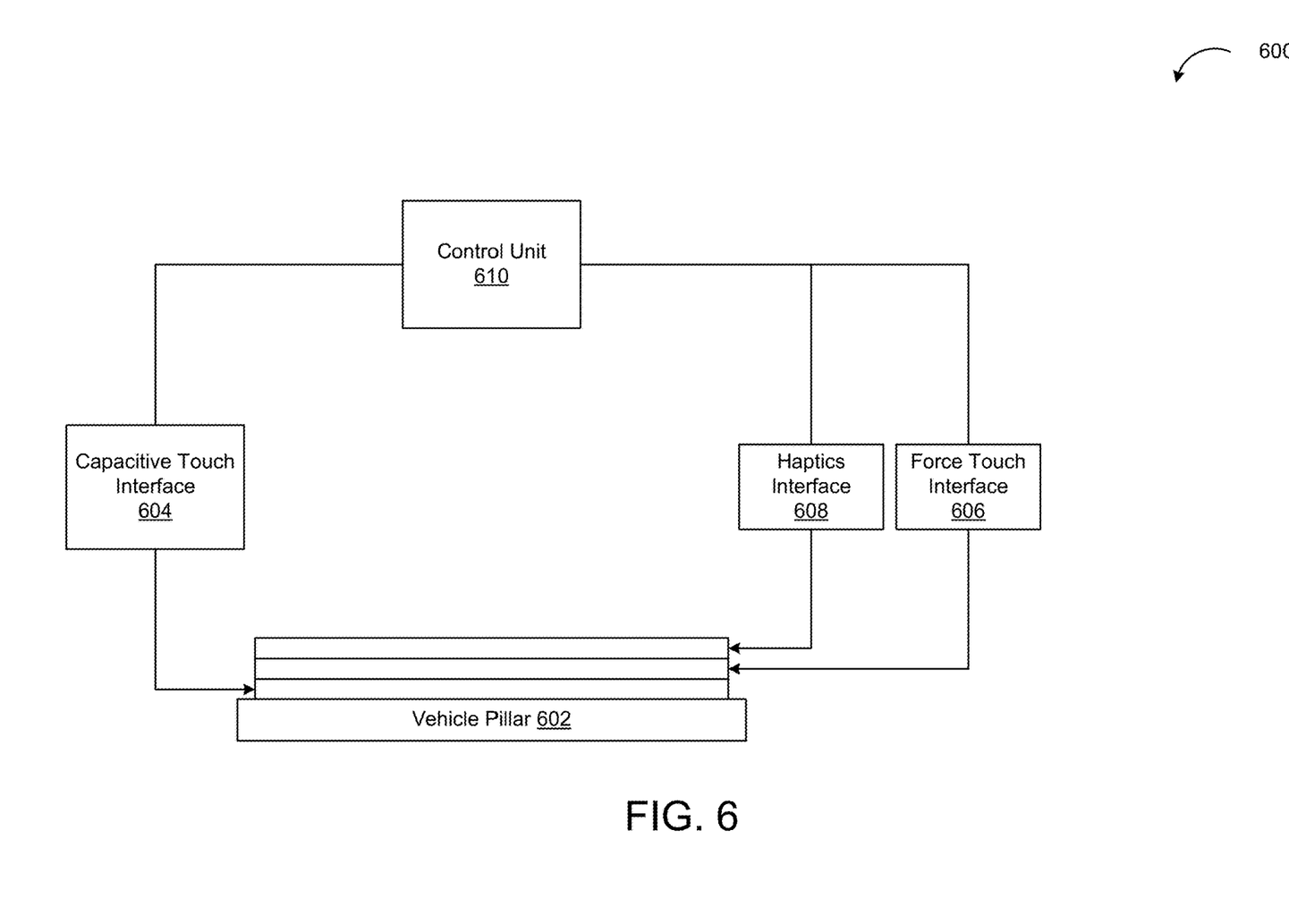
FIG. 6 depicts a diagram of an electrical architecture/interface for pillar implementation, according to at least one embodiment of the present disclosure.

FIG. 6 depicts a diagram 600 of an electrical architecture/interface for pillar implementation, according to at least one embodiment of the present disclosure.

As depicted in FIG. 6, a vehicle pillar 602 is integrated with a plurality of layers, comprising: a capacitive touch interface 604; a force touch interface 606; and a haptics interface 608. A control unit 610 may refer to electrical circuitry that comprises executable instructions for receiving and processing user inputs.

In various embodiments, digital shading control technology is integrated in a pillar 602 a vehicle, such as an A-pillar, B-pillar, C-pillar, and so on and so forth.

Force touch technology and haptics technology can be integrated into pillars to control glass shades. In at least one embodiment, the control pillar is integrated with the capacitive touch interface, a force touch interface, and a haptics interface. Similarly, both the traditional Force Touch technology and the new transparent Force Touch technologies can be used in this implementation since the control pillar does not have to be transparent.

As an illustrative, non-limiting example, an occupant of a vehicle such as the driver may wish to adjust the shading of the side-view mirrors for a variety of reasons, such as environmental conditions that may make greater or lesser levels of shading more conducive to driving. Continuing with the example, at least one embodiment of the present invention involves the occupant using shading controls integrated into the A-pillars of the vehicle to adjust the shading levels one or both side-view mirrors.

A capacitive touch interface 604 may be integrated with vehicle pillar 602 as depicted in FIG. 6. In various embodiments, the capacitive touch interface 604 is operable for users to select shading areas. Capacitive touch technology is based on capacitive coupling and can be used to detect and measure anything that is conductive or has a dielectric different from air. Many types of sensors use capacitive sensing, including sensors to detect and measure proximity, pressure, position and displacement, force, humidity, fluid level, and acceleration.

A suitable force touch interface 606 may be based on transparent materials that can be integrated with glass or pillars of a vehicle. Both traditional force touch technology and transparent force touch technologies can be used in this implementation. A non-limiting, illustrative example of a force touch technology is transparent piezo films that can be used to sense forces applied on surfaces. The transparent piezo films can be laminated onto glass surfaces using optical bonding technology. Another technology is integrating a type of force sensitive material with capacitive touch sensors. In various embodiments, such as those in which the shading control system is integrated into a pillar, both traditional force touch technology and transparent force touch technologies can be used in this implementation since the control display does not have to be transparent in such cases.

A haptics interface 608 may be used to generate surface haptics and integrated with glass. Both surface haptics technology and traditional vibration haptics technology can be used. One technology is based on electrostatic fields to generate surface haptics. The technology involves an additional ITO (indium tin oxide) layer to be laminated on top of a glass surface to generate surface haptics when a finger is moving on the surface. Another technology is based on ultrasonic fields. The technology needs very thin and small ultrasonic actuators to be attached to the back of glass to generate surface haptics. Various types of ultrasonic field technologies support taps and clicks.

Control unit 610 may be implemented as electronic circuitry that is operable to detect and process control commands from a user. Force touch technology may provide signals that are used to determine a shading intensity. Haptics technology may be used to provide tactile feedback to the user. Capacitive touch technology may be used to trace finger movements. Control unit 610 may be connected to one or more vehicle glasses, such as windshields and side windows with transparency-changing material interfaces that can be controlled by the control unit 610.

Figure 7:
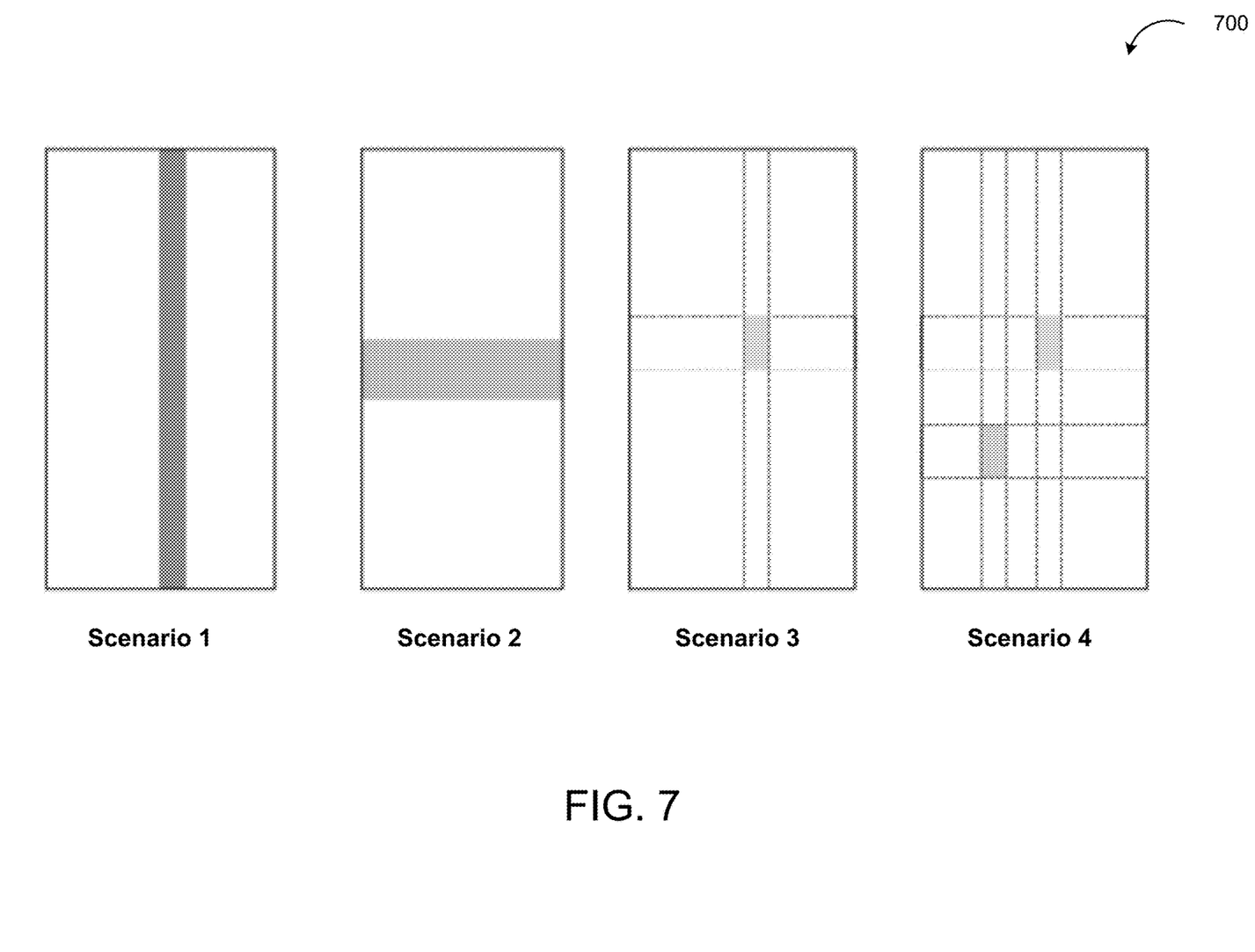
FIG. 7 depicts a diagram in which zone-based shading controls are integrated with a pillar, according to at least one embodiment of the present disclosure.

FIG. 7 depicts a diagram 700 in which zone-based shading controls are integrated with a pillar, according to at least one embodiment of the present disclosure.

A control pillar can be used as a single area for shade control to control a windshield or window. For example, touching on any area or a specific area of the pillar can achieve pre-selection and pushing on the surface can change shade intensity. However, to achieve area control, a pillar may be divided into columns and rows, corresponding to areas in a windshield or vehicle window. By selecting one or more columns/rows, the system can control corresponding area(s) in a windshield or vehicle window. Various scenarios are depicted in FIG. 7 and explained in greater detail below.

In these scenarios, outline big boxes represent vehicle pillars, colored areas mean those areas are selected (there could be some indication showing on the control pillar when this area is selected), dotted lines are for illustrative purposes only.

Scenario 1 shows one column is selected and shade intensity can then be changed in the corresponding area in a windshield/window.

Scenario 2 shows one row is selected and shade intensity can then be changed in the corresponding area in a windshield/window.

Scenario 3 shows one row and one column are selected, and shade intensity can then be changed in the corresponding overlapped area in a windshield/window.

Scenario 4 shows two row and two columns are selected, and shade intensity can then be changed in the corresponding overlapped areas in a windshield/window. Multiple area selection can be designed to be like this, once a row and a column are selected, and the overlapped area is confirmed, then this row and this column cannot be used for another selection. Multiple area selection can also be designed to be like this, once a row and a column are selected, this row and this column can still be used for another selection, and all overlapped areas are selected when the user is done with selection. Scenario 4 depicts the first way of doing multiple area selection.

Figure 8:
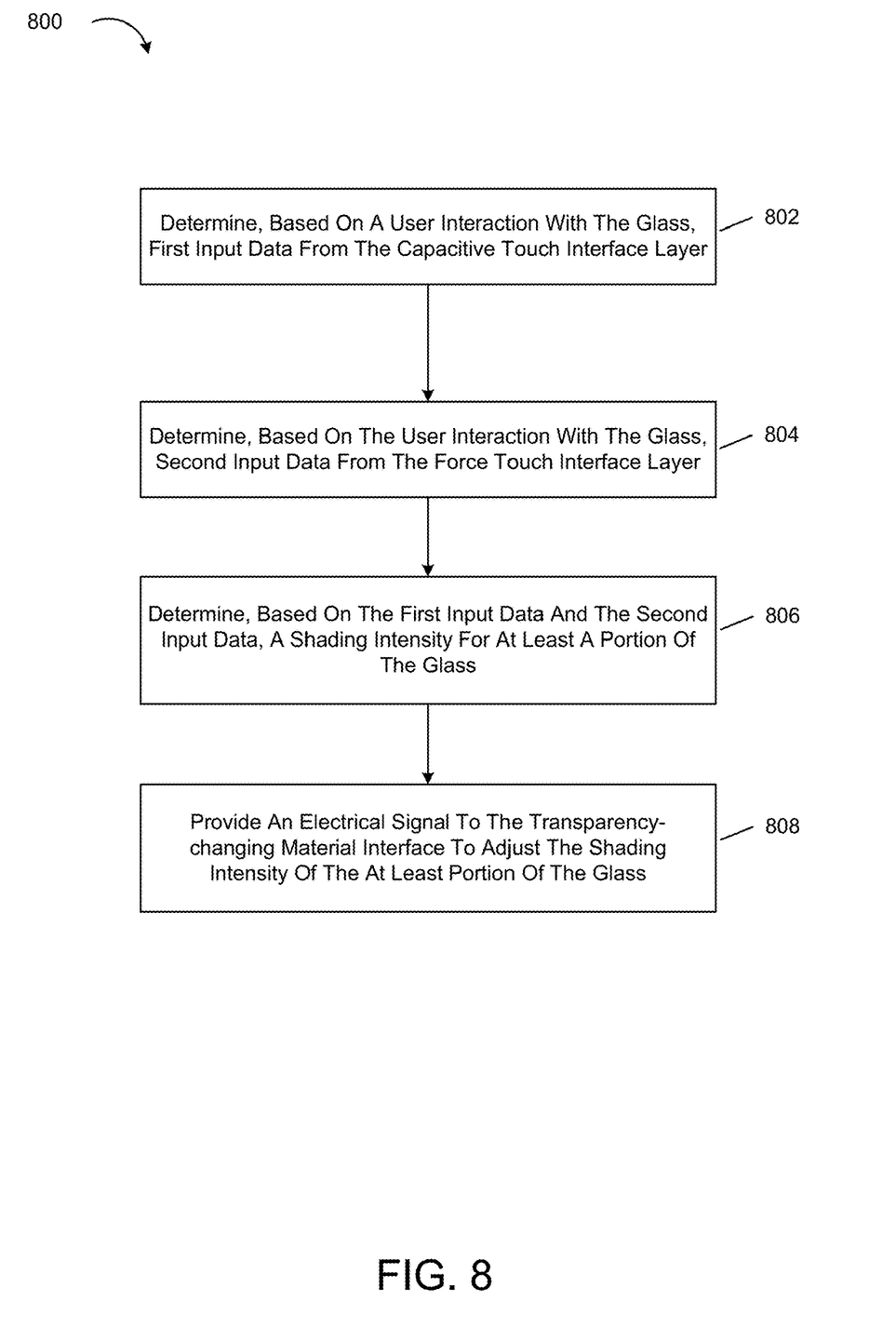
FIG. 8 shows an illustrative example of a process for force touch and haptics based digital shading control, in accordance with one or more example embodiments of the present disclosure.

FIG. 8 shows an illustrative example of a process 800 for multidisciplinary vehicle design, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1-7. In at least one embodiment, process 800 or a portion thereof is collectively implemented by a computer system.

Process 800 may be implemented in the context of a digital shading control system integrated into glass of a vehicle. Vehicle glass may be integrated with a plurality of layers, comprising: a transparency-changing material interface layer disposed of over the glass; a capacitive touch interface layer disposed of over the transparency-changing material interface layer; a force touch interface layer disposed of over the capacitive touch interface layer; and a haptics interface layer disposed of over the force touch interface layer. A control unit may refer to electrical circuitry that comprises executable instructions for receiving and processing user inputs, for example, as described above. In some embodiments, process 800 may be implemented in the context of a vehicle pillar that integrates a digital shading control system for controlling one or more glass surfaces of a vehicle.

In various embodiments, process 800 comprises a step to determine, based on a user interaction with the glass, first input data from the capacitive touch interface layer 802. The user interaction may be a tap, drag, hold, or other touch-based gesture. It should be noted that when the user interaction with the glass may involve touching or tapping one or more interface layers that are disposed of on the glass, for example, a capacitive touch layer for sensing user interactions. Capacitive touch interface is operable for users to select shading areas. Capacitive touch technology is based on capacitive coupling and can be used to detect and measure anything that is conductive or has a dielectric different from air. Many types of sensors use capacitive sensing, including sensors to detect and measure proximity, pressure, position and displacement, force, humidity, fluid level, and acceleration In various embodiments, process 800 comprises a step to determine, based on the user interaction with the glass, second input data from the force touch interface layer 804. A suitable force touch interface may be based on transparent materials that can be integrated with glass. A non-limiting, illustrative example of a force touch technology is transparent piezo films that can be used to sense forces applied on surfaces. The transparent piezo films can be laminated onto glass surfaces using optical bonding technology. Another technology is integrating a type of force sensitive material with capacitive touch sensors. Another technology is integrating a type of force sensitive material with capacitive touch sensors. In various embodiments, such as those in which the shading control system is integrated into a pillar, both traditional force touch technology and transparent force touch technologies can be used in this implementation since the control display does not have to be transparent in such cases.

In various embodiments, a haptics interface layer may be used to generate surface haptics and integrated with glass. Both surface haptics technology and traditional vibration haptics technology can be used. One technology is based on electrostatic fields to generate surface haptics. The technology involves an additional ITO (indium tin oxide) layer to be laminated on top of a glass surface to generate surface haptics when a finger is moving on the surface. Another technology is based on ultrasonic fields. The technology needs very thin and small ultrasonic actuators to be attached to the back of glass to generate surface haptics. Various types of ultrasonic field technologies support taps and clicks.

In various embodiments, process 800 comprises a step to determine, based on the first input data and the second input data, a shading intensity for at least a portion of the glass 806. The first input data and second input data may both arise out of the same user interaction. For example, a tap and hold at predetermined locations that correspond to specific zones of a windshield/glass, or that correspond to the entire windshield/glass.

In various embodiments, process 800 comprises a step to provide an electrical signal to the transparency-changing material interface to adjust the shading intensity of the at least portion of the glass 808. Transparency-changing interface may be implemented as a thin film that is applied on top of traditional vehicle glass. These materials can be optically bonded to glass and can be electrically controlled to change opaqueness/transparency. Light transmission properties of the transparency-changing interface may be dynamically controlled in response to an applied voltage. When a voltage is applied, the amount of light transmission may be applied. In various embodiments, the transparency-changing interface 104 does not require a constant electrical current—that is, once the change has been effected, no electricity is needed for maintaining the particular shade which has been reached. A transparency-changing material interface may be applied as a layer on top of a transparent or semi-transparent surface such as a windshield, window, mirror, etc. of a vehicle.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A digital shading control system integrated into glass of a vehicle, comprising:
   a transparency-changing material interface layer;
   a capacitive touch interface layer;
   a force touch interface layer;
   a haptics interface layer; and
   a control unit comprising:
      one or more processors; and
      memory storing executable instructions that, as a result of execution by the one or more processors, cause the one or more processors to:
         determine, based on a user interaction with the glass, first input data from the capacitive touch interface layer;
         determine, based on the user interaction with the glass, second input data from the force touch interface layer;
         determine, based on the first input data and the second input data, a shading intensity for at least a portion of the glass; and
         provide an electrical signal to the transparency-changing material interface to adjust the shading intensity of the at least portion of the glass.

2. The digital shading control system of claim 1, wherein the haptics interface layer is a surface haptics interface layer.

3. The digital shading control system of claim 2, wherein the surface haptics layer comprises an ITO (indium tin oxide) layer.

4. The digital shading control system of claim 1, wherein:
   the first input data comprises selection of a region of the glass that corresponds to a first zone of the glass; and
   the second input data comprises an amount of force applied to the glass that corresponds to the shading intensity.

5. The digital shading control system of claim 1, wherein the user interaction comprises tapping the glass of the vehicle.

6. The digital shading control system of claim 1, wherein the glass of the vehicle is a windshield, side window, or back window of the vehicle.

7. The digital shading control system of claim 1, wherein the capacitive touch interface layer, the force touch interface layer, and the haptics interface layer are made of transparent materials.

8. A vehicle, comprising:
   glass having a transparency-changing material interface layer;
   a vehicle pillar integrated with a digital shading control system, comprising:
      a capacitive touch interface layer;
      a force touch interface layer;
      a haptics interface layer; and
   a control unit comprising:
      one or more processors; and memory storing executable instructions that, as a result of execution by the one or more processors, cause the one or more processors to:
  determine, based on a user interaction with the pillar, first input data from the capacitive touch interface layer;
  determine, based on the user interaction with the pillar, second input data from the force touch interface layer;
  determine, based on the first input data and the second input data, a shading intensity for at least a portion of the glass; and
  provide an electrical signal to the transparency-changing material interface to adjust the shading intensity of the at least portion of the glass.

9. The vehicle of claim 8, wherein the pillar is an A-pillar of the vehicle.

10. The vehicle of claim 8, wherein the one or more processors are configured to determine, based on the user interaction with the pillar, the first input data by at least:
  determine that the user interaction is a tap at a first control region of the pillar; and
  determine that the first control region of the pillar is associated with the at least portion of the glass.

11. The vehicle of claim 8, wherein:
  the first input data comprises selection of a region of the glass that corresponds to a first zone of the glass; and
  the second input data comprises an amount of force applied to the glass that corresponds to the shading intensity.

12. The vehicle of claim 8, wherein the user interaction comprises tapping the pillar of the vehicle.

13. The vehicle of claim 8, wherein the glass is a windshield of the vehicle, side window, or back window of the vehicle.

14. The vehicle of claim 8, wherein the system is further configured to:
  determine, based on a second user interaction with the pillar, third input data from the capacitive touch interface layer;
  determine, based on the second user interaction with the pillar, fourth input data from the force touch interface layer;
  determine, based on the third input data and the fourth input data, a second shading intensity for at least a portion of a second glass; and
  provide a second electrical signal to a transparency-changing material interface of the second glass to adjust the second shading intensity of the at least portion of the second glass.

15. A method for digital shading control of a glass of a vehicle, comprising:
  determine, based on a user interaction with the glass, first input data from a capacitive touch interface layer;
  determine, based on the user interaction with the glass, second input data from a force touch interface layer;
  determine, based on the first input data and the second input data, a shading intensity for at least a portion of the glass;
  provide, based on the user interaction with the glass, tactile feedback using the force touch interface layer; and
  provide an electrical signal to a transparency-changing material interface to adjust the shading intensity of the at least portion of the glass.

16. The method of claim 15, wherein the glass comprises a surface haptics interface layer.

17. The method of claim 16, wherein the surface haptics layer comprises an ITO (indium tin oxide) layer.

18. The method of claim 15, wherein:
  the first input data comprises selection of a region of the glass that corresponds to a first zone of the glass; and
  the second input data comprises an amount of force applied to the glass that corresponds to the shading intensity.

19. The method of claim 15, wherein the user interaction comprises tapping the glass of the vehicle.

20. The method of claim 15, wherein the glass of the vehicle is a windshield, side window, or back window of the vehicle.

* * * * *